July 27, 1954  A. S. KHOURI  2,684,522

THIN HIGH DIELECTRIC CONSTANT SHEETS

Filed July 24, 1950

INVENTOR.
ALFRED S. KHOURI
BY John W. Michael
ATTORNEY

Patented July 27, 1954

2,684,522

UNITED STATES PATENT OFFICE 2,684,522

THIN HIGH DIELECTRIC CONSTANT SHEETS

Alfred S. Khouri, Milwaukee, Wis., assignor to Globe-Union Inc., Milwaukee, Wis., a corporation of Delaware Application July 24, 1950, Serial No. 175,628

2 Claims. (Cl. 29—195)

This invention relates to improvements in thin, high dielectric constant sheets and to the process of making them.

Thin members made of high dielectric constant ceramic have valuable use in the manufacture of capacitors because of the extremely high capacitance which can be obtained with a dimensionally small capacitor utilizing such members as the dielectric. However, it is extremely difficult to handle such thin ceramic pieces in the assembly process. They are very fragile and brittle and in storing and handling so much breakage occurs that up to the present time it has been impractical to use them in commercial fabrication. Heretofore the advantages due to the thinness of the dielectric pieces have been sacrificed in order to overcome the disadvantages arising from their use.

It is therefore an object of this invention to provide a sheet having the electrical characteristics of a thin, high dielectric constant ceramic member which may be readily handled and easily stored in the process of fabricating capacitors and other electrical components.

Another object of this invention is to provide a sheet having the electrical characteristics of a capacitor having a thin, high dielectric constant ceramic insulator, which sheet may be treated mechanically as if it were a sheet of thin soft metal.

Another object of this invention is to provide a method for making thin sheets having the electrical characteristics of thin ceramic members which sheets are not fragile and may be cut, punched, sheared, and otherwise mechanically treated in manufacturing processes.

A still further object is to provide a thin sheet having the electrical characteristics of a thin piece of high dielectric ceramic from which sheet small sections of predetermined size and configurations may be broken without injury to the remaining sheet.

These methods are accomplished by taking a thin sheet of ceramic in the fired state, bonding a metallized coating thereto, and cladding such coating with a heavy metal sheathing. The heavy sheathing of metal being intimately and tenaciously bonded with the metallized coating and thus with the ceramic layer holds together the thin sheet thus formed and provides sufficient mechanical strength so that such sheet may be treated as if it were a sheet of metal (the ceramic may be cracked in the process but that does not matter—it is still bonded to the metal and retains its electrical characteristics).

The thin fragile ceramic layer loses its mechanical characteristics in the completed unit but keeps its electrical characteristics. Each unit then has the physical and mechanical characteristics of the metal sheathing. Because the metal sheathing is a conductor and is directly adhered to the metallized coating, such coating may be the plate of a capacitor and will be separated from a similar plate on the other surface of the ceramic layer only by the thickness of such ceramic layer. Under this process sheets may be made in which the thickness of the ceramic layer is less than .005". This characteristic, together with the high dielectric constant of such layer, makes the sheet highly useful in the developing of high capacitances using small dimensions. The thickness of the heavy metal sheathing when deposited on both sides of the ceramic layer may be as little as .007". Its limit is not important if it is strong enough to hold together and thin enough to be readily cut. It is important, however, to have a good adherence between the metallized conductive undercoating and the heavy metal sheathing. This may be accomplished by electroplating or by metalspraying. The metal sheathing may be bonded to one or both sides of the ceramic layer and the resulting sheet may be cut or punched, or otherwise treated as a sheet of metal. Each section which is cut or punched therefrom has all of the essential elements of and constitutes a capacitor having a thin, high constant ceramic dielectric. The conductive film or undercoating and the layer of metal sheathing may be bonded to only one side of the ceramic layer. In such instance the metal sheathing may be provided with a plurality of void or scoring lines separating such sheathing into sections of predetermined size and configuration. The sheet so formed may be fractured along such lines to create simple units having shapes as outlined by such sections. These units may be used, for example, as the movable member of a trimmer capacitor.

The novel features, which are considered characteristic of the invention, are set forth with particularity in the appended claims. The invention itself, however, both as to its organization and its method of operation, together with additional objects and advantages thereof, will best be understood from the following description of specific embodiments when read in connection with the accompanying drawings, in which:

Figure 1:
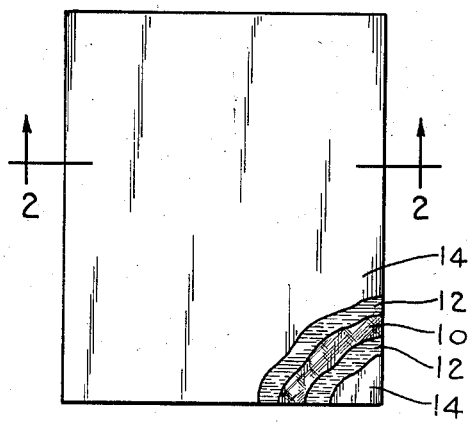
Fig. 1 is a plan view of a thin, high dielectric constant sheet embodying the present invention, part of the layers being broken away for clarity in illustration.
Figure 2:
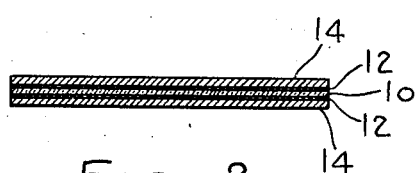
Fig. 2 is a sectional line taken on line 2—2 of Fig. 1.

Referring to the drawing by reference numerals, the thin, high dielectric constant sheet illustrated in Figs. 1 and 2 embodies a thin layer 10 of high dielectric constant ceramic. To each surface of layer 10 there is bonded a metallized coating 12 which may consist of a conductive paint of the silver glaze type. Such paint is applied in a well-known manner and when metallized constitutes conductive layers which act as the plates of a capacitor. There is adhered to and tenaciously bonded with such conductive layers 12 a heavy layer or sheathing 14 of metal. One of the important characteristics of such sheet is that the ceramic layer 10 is extremely thin. Samples have been made in which the thickness of such ceramic layer is approximately .003". In addition to this physical thinness, such ceramic layer 10 may have constituents which cause it to have a dielectric constant of 6,000, or above. A ceramic which has a mixture of basically titanium dioxide with added materials, such as rare earths or various titanates, gives excellent results. The metal sheathing 14 supplies the mechanical strength to the sheet and prevents the very fragile thin ceramic layer 10 from breaking. Pieces or sections of various shapes may be cut or die-punched from such sheet as if it were a sheet of soft metal. Each section so cut has all the elements of a completed capacitor which has a high capacitance with small dimensional space requirements. The metal sheathing 14 is a good electrical conductor and does not in any way deter from the electrical characteristics of such capacitors.

To make the sheet shown in Figs. 1 and 2, a thin layer of the high dielectric constant ceramic in its fired state is used. Such layer may be made in accordance with the method set forth in U. S. Patent 2,486,410, issued November 1, 1949, to G. N. Howatt, or by extrusion. The area of the sheet may vary and may be as large as 4 x 5 inches. The thickness of such layer varies but may be as low as .002" or .003". The layer 10 is coated with a conductive paint. In this particular embodiment a silver glaze type of paint is used and the coat is applied by dipping the layer 10 in a container of such paint. The layer 10 is then withdrawn from the paint and allowed to drain and dry. After it is dry the layer is fired at 1400° F. which produces a highly conductive and tenaciuosly adhering silver film 12 on the surfaces of the layer 10. Thereafter the layer is placed in a copper electroplating bath and a heavy coating of sheathing of copper 14 is deposited to a depth of about .007" on both sides of the layer. After the sheathing 14 has been applied the sheet may be handled as if it were a sheet of copper without any injury or damage to the ceramic layer 10. The sheet may be stored in such form and used when desired.

It can be placed in punch presses and have sections die cut therefrom without injury to the balance of the sheet. The thickness of the heavy metal sheathing 14 is not critical with the exception that it must be thick enough to hold the sheet together and keep its shape during a punching or cutting process and thin enough to be easily cut and punched. It may be necessary at times to remove the streamers of the copper layer 14 which may be forced across the cut edges of the sheet. These have a tendency to short circuit the plates of the capacitor. It is only necessary to etch the sections cut from the sheet in an etching bath, such as twenty-five per cent nitric acid and seventy-five per cent water. However, the necessity of such a step may be entirely eliminated if the punching or cutting is done with properly sharpened tools.

In lieu of applying the sheathing 14 by electroplating, such sheathing may be applied by the well-known metal spraying process. In the latter event the sheathing of copper so deposited on the sheet must have the same characteristics as to strength and workability as is the case with the electroplating sheathing. In both cases it is essential that there be an intimate and tenacious bond between the sheathing 14 and the undercoating 12.

Figure 3:
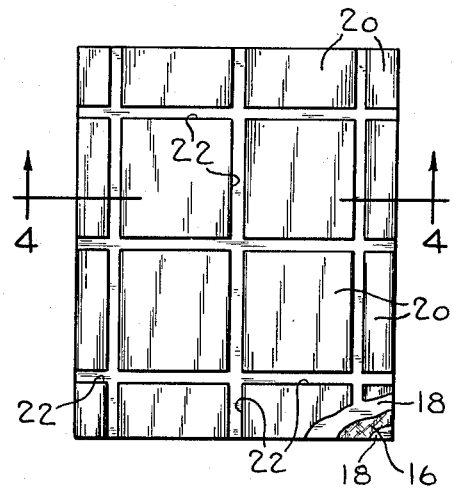
Fig. 3 is a plan view of a modified form of a thin, high dielectric constant sheet embodying the invention, part of the layers being broken away for clarity in illustration.
Figure 4:
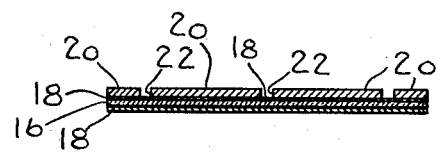
Fig. 4 is a sectional view taken on line 4—4 of Fig. 3.

The modified form of thin, high dielectric constant sheet shown in Figs. 3 and 4 consists of a thin, high dielectric constant ceramic layer 16 to the surfaces of which is adhered a silver conductive film 18. To the film on one side only of the layer 16 there is deposited a relatively thick layer of metal 20, such as copper. However, void or score lines 22 are formed in the metal layer 20 in the shape of a grid so as to cut such layer into rectangular sections. The sheet thus formed may be readily stored and handled and when it is desired to utilize a section thereof such section may be readily fractured from the main body of the sheet without damage thereto. The layer 16 and the undercoating 18 will fracture along the score lines when bending pressure is properly applied. The fractured edges are clean and no etching of the metal is required such as might be the case in the first modification. Each of the sections which are fractured from the main sheet constitutes a thin layer of ceramic and two conductive plates of a capacitor. The shape of the sections need not be of regular configuration. Any configuration which fits a definite requirement may be used.

In making the modification of Figs. 3 and 4, a thin layer of high dielectric ceramic 16 in the fired state is obtained by the same process as the ceramic layer of the first modification. After dipping or otherwise applying the films of conductive paint 18 of the silver glaze type, the layer 16 is dried and fired in the same manner as the first modification to create a highly conductive and tenacious adhering silver film 18. The lower surface (as viewed in Fig. 4) of the plate 16 then has applied to it an insulating mask which covers its entire area. Lines of insulating masking are then applied to the outer surface of film 18 in the form shown in Fig. 3, or in such other configurations as may be desired. The sheet is then electroplated in a copper electroplating solution in the same manner as in the case of the first modification. The insulating mask and masking will prevent the deposition of the copper or other metal along the grid lines and on the lower surface. As a result a relatively thick layer of copper 20 separated into sections by the score or void lines 22 is deposited on the upper surface.

Figure 5:
Fig. 5 is a fragmentary plan view of still another modification of the invention.
Figure 6:
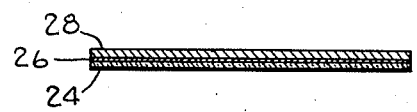
Fig. 6 is a sectional view taken on line 6—6 of Fig. 5.

In the modification of the invention shown in Figs. 5 and 6, the thin high dielectric constant sheet consists of a thin high dielectric ceramic layer 24 to one surface of which is adhered a silver conductive film 26. On such film there is deposited a relatively thick layer of metal 28 such as copper. The metal layer 28 so shown is solid. However, it is within the scope of this invention that such layer have void or score lines formed therein, such as in the modification of Figs. 3 and 4. The sheet thus formed may be readily handled and stored and sections cut or die-punched therefrom as desired. If the layer 28 is scored, then the sections may be fractured from the main body of the sheet. Each of the sections which are fractured from the main sheet constitutes a thin layer of ceramic and one conductive plate of a capacitor. One use for such sections is in the manufacture of variable capacitors.

In making the modification of Figs. 5 and 6, a thin layer of high dielectric ceramic 24, obtained as heretofore described in connection with the other modifications, has applied to one surface thereof by the well-known spraying or screening process the layer of conductive paint 26 of the silver glaze type. The sheet is then dried and fired in the manner previously described to create a highly conductive and tenacious adhering silver film. The sheet is then electroplated in a copper electroplating solution to deposit on the silver film 26 the layer of copper cladding 28. If desired, lines of insulating masking may be first applied to the silver film 26 before electroplating in order to have the copper layer 28 scored for fracturing as in the case of the modification of Figs. 3 and 4.

If the heavy metal sheathing such as the copper layers 14 or 20 could be applied and tenaciously bonded directly to the surface of the ceramic layer 10 there would be no necessity for the undercoatings or silver films 12 or 18. The metal sheathing or heavy metal layer would act as the plates of the capacitor in the same manner as does such silver film. In such event the resulting sheet would have the same characteristics as that made by using the silver undercoating as the method of firmly bonding the heavy sheet to the ceramic surface.

Although only several embodiments of the invention are shown and described herein, it will be understood that this application is intended to cover such other changes or modifications as come within the spirit of the invention or scope of the following claims.

I claim:

1. A sheet which may be utilized as a high value capacitor comprising a preformed, relatively thin layer of less than .005 inch in thickness of a ceramic material which includes as a basic ingredient a titanium oxide compound to provide a high dielectric constant, a conductive, metallized, fired coating bonded to a surface of said ceramic layer, and a relatively thick layer of metal intimately and tenaciously adhered to said coating, whereby the thin fragile ceramic layer looses its mechanical identity in the sheet and the relative strength and toughness of said layer supplies the mechanical strength for the sheet, the thickness of said metal layer being such as to enable the sheet to be cut, punched, or sheared.

2. A thin sheet having the electrical characteristics of a thin, high dielectric constant ceramic member and being capable of being treated mechanically as a sheet of soft metal, said sheet comprising a preformed, relatively thin layer of less than .008 inch in thickness of a ceramic material which includes as a basic ingredient a titanium oxide compound in the form of a titanate to provide a high dielectric constant of at least 6000, conductive, metallized, fired coatings bonded to opposite surfaces of said ceramic layer, and relatively thick layers of metal bonded to said fired coatings, said layers of metal comprising the primary structural support for said sheet and enabling the sheet to be cut, punched, or sheared.

References Cited in the file of this patent

UNITED STATES PATENTS

| Number | Name | Date |
| --- | --- | --- |
| 653,024 | King | July 3, 1900 |
| 1,647,474 | Seymour | Nov. 1, 1927 |
| 1,892,755 | Scheppmann | Jan. 3, 1933 |
| 2,211,582 | Rub | Aug. 13, 1940 |
| 2,392,614 | Prescott | Jan. 8, 1946 |

FOREIGN PATENTS

| Number | Country | Date |
| --- | --- | --- |
| 626,357 | Great Britain | July 13, 1949 |
| 474,790 | Germany | Apr. 13, 1929 |

OTHER REFERENCES

Metallizing Glass and Ceramic Materials, by A. J. Monack, Glass Industry, January 1947, pages 21–25, 43 and 44.